2,477,784

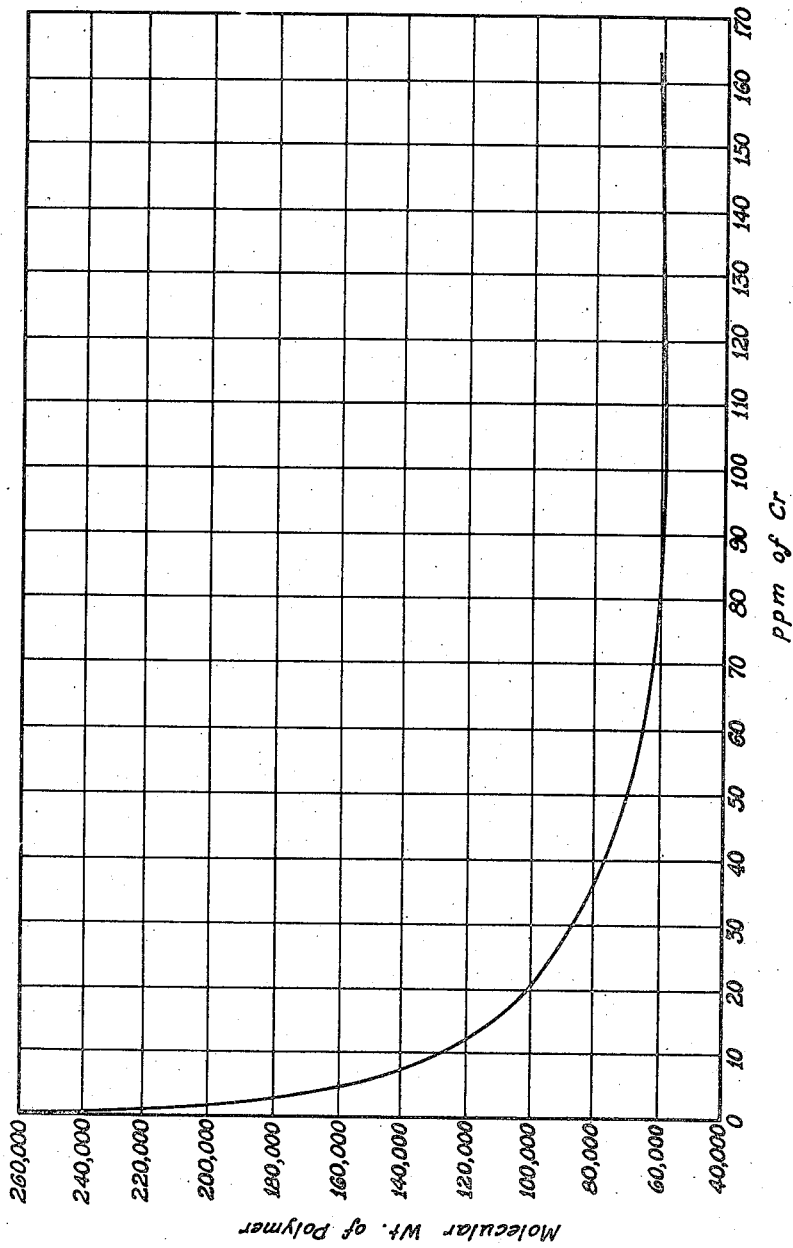
INVENTORS
Edgar C. Britton
Walter J. LeFevre
BY
Griswold & Burdick
ATTORNEYS Patented Aug. 2, 1949

UNITED STATES PATENT OFFICE 2,477,784

POLYMERIZATION OF VINYL AROMATIC COMPOUNDS

Edgar C. Britton and Walter J. Le Fevre, Midland, Mich., assignors to The Dow Chemical Company, Midland, Mich., a corporation of Delaware Application March 6, 1944, Serial No. 525,256

11 Claims. (Cl. 260—93.5)

This invention concerns an improved method for the polymerization of vinyl aromatic compounds having the vinyl group attached to the carbon atom of the aromatic nucleus, which method permits the reaction to be carried out rapidly and with control so as to obtain products of desired molecular weight.

It is well known that the physical properties of polymeric products are dependent in part upon the molecular weight of the polymers and that for some purposes polymers of high molecular weight are desired, whereas for other purposes corresponding polymers of relatively low molecular weight are preferred. For instance, solid polystyrene of molecular weight below 50,000 (according to the well-known Staudinger method of determining molecular weights) is often brittle, but the polymer becomes tougher and less fragile with increase in the molecular weight. It should be mentioned that the products obtained by polymerizing vinyl or vinylidene compounds usually comprise polymer molecules of varying molecular weights and that it is the average molecular weight of the polymeric product which is determined by the Staudinger method and is hereinafter referred to as the molecular weight of such product.

For molding purposes, polystyrene of molecular weight above 50,000, e. g. of from 70,000 to 200,000, is preferred. This is the usual quality of polystyrene on the market. On the other hand, solid polystyrene of lower molecular weight dissolves more readily and rapidly in many organic solvents and is preferred as an ingredient of varnishes and lacquers.

The present industrial methods for polymerizing vinyl aromatic compounds are such as to produce the higher molecular weight polymers just mentioned. It is known that the molecular weight of the polymeric products generally becomes lower with increase in the polymerization temperatures at which they are formed and polystyrene of low molecular weight has in some instances been prepared by carrying polymerizations out at unusually high temperatures, e. g. at temperatures of 200° C. or above. However, due to operating difficulties which are encountered at such high polymerizing temperatures, this method for producing the lower molecular weight polymers and copolymers is not well adapted to commercial practice.

The provision of a simple and convenient method for rapidly polymerizing or copolymerizing vinyl aromatic compounds to produce polymeric products having a desired average molecular weight, or a desired set of physical properties, should widen the fields of utility for the polymers. It is an object of this invention to provide such a method. A particular object is to provide such method whereby the polymerization reaction may be controlled to obtain polymeric products of predetermined molecular weight. Other objects will be apparent from the following description of the invention.

This application is a continuation-in-part of our copending application, Serial No. 343,438, filed July 1, 1940, now U. S. Patent No. 2,359,196. In said copending application, we have shown that vinyl aromatic compounds may be polymerized rapidly and completely by carrying the polymerization out in an aqueous emulsion containing a peroxide and an acid in amount sufficient to acidify the emulsion. The polymers and copolymers obtained by such method are usually of fairly high molecular weight, e. g. 80,000 or above.

We have now found, when polymerizing or copolymerizing a monovinyl aromatic compound in accordance with the method of said copending application, that the reaction may be controlled to produce polymer products of molecular weights lower than would otherwise be obtained by initially adding to the emulsion a chromium salt which is soluble or emulsifiable in the reaction mixture. We have further found that, under otherwise similar polymerization conditions the molecular weight of the polymer which is formed decreases in a regular manner upon increase of the proportion of the chromium compound from a mere trace to an appreciable amount, e. g. an amount corresponding to several hundred parts by weight of chromium per million parts of the unsaturated organic compound or compounds to be polymerized. Accordingly, the invention permits control of the polymerization reaction to produce polymeric products of predetermined molecular weight by adding a chromium compound in amount such as to produce the desired product. Addition of the chromium compound does not retard the rate or extent of the polymerization reaction and, in fact, appears to accelerate the reaction to an appreciable extent, but the principal function of the added chromium compound is that of controlling the molecular weight of the polymer which is formed.

However, we have further found that such action of a chromium salt in influencing the molecular weight of the polymeric product is obtained to an appreciable extent only when the emulsion is at a pH value below 3. At higher pH values, the molecular weight of the polymer which is formed does not differ greatly from that of the polymer formed in the absence of the chromium salt under otherwise similar conditions. In practice the pH value of the emulsion is usually maintained within the narrow range of from 1.5 to 2.8, and preferably from 2 to 2.6, since it becomes increasingly difficult to maintain a stable emulsion as the pH value is lowered below 2, and the effectiveness of the chromium salt in controlling the molecular weight of the polymeric product decreases sharply as the pH value is increased from 2.6 to 3.

It should be mentioned that certain variable factors other than the pH value of the emulsion, the presence of a peroxide, and the proportion of a chromium salt in the emulsion, may also influence the molecular weight of the polymeric product. For instance, the molecular weight of the product varies somewhat with change in the temperature at which it is formed. However, within the range of temperatures which are satisfactory for carrying out the emulsion polymerization reactions, the influence of a change in temperature on the molecular weight of the polymer is small compared to that which may be effected by changing the proportion of chromium salt in the emulsion. Peculiarly, the influence of a change in the reaction temperature on the molecular weight of the product becomes less with increase in the proportion of a chromium salt in the emulsion.

An increase in the proportion of a peroxide in the emulsion, over the amount required as a catalyst, usually results in a decrease in the molecular weight of the polymer which is formed, but this effect also is small compared to that of an equal change, on a weight basis, in the proportion of chromium (as a chromium salt) in the emulsion. The kind and proportion of emulsifying agent may also influence the molecular weight of the polymer, and different emulsifying agents differ widely in this respect, i. e. a change in the proportion of certain emulsifying agents has little or no effect on the molecular weight of the polymer, but a change in the proportion of other emulsifying agents may have a pronounced effect. However, regardless of identity of the emulsifying agent employed, the foregoing effects of the chromium salt in conjunction with the peroxide and an acid are obtained.

The accompanying drawing is a graph illustrating the effect of changes in the proportion of a chromium compound, present during the polymerization of styrene in an acidic peroxide-containing aqueous emulsion, on the molecular weight of the polystyrene which is formed. As will be seen from the graph, the molecular weight of the product decreases sharply as the proportion of chromium present during preparation of the same is increased from a mere trace up to about 70 parts of chromium per million parts of styrene.

In polymerizing a vinyl aromatic compound, or in copolymerizing such compound with other polymerizable unsaturated organic compounds, in accordance with the invention, the compounds to be polymerized are added to an aqueous solution of an emulsifying agent, a peroxide, and sufficient acid to reduce the pH value of the emulsion to between 1.5 and 3, and preferably between 2 and 2.6. A chromium compound which is soluble in, or emulsifiable with, the other ingredients is added in the proportion necessary to cause formation of a polymeric product of desired molecular weight. The peroxide is usually employed in amount corresponding to between 0.1 and 1.0 per cent of the weight of the organic compound or compounds to be polymerized, but it may be used in even smaller amount or in as large a proportion as desired. The employment of an excess of peroxide over the amount required to produce the catalytic effect is wasteful, but is not detrimental to the reaction. Examples of peroxides which may be added as catalyst ingredients are hydrogen peroxide, sodium or potassium persulphate, sodium perborate, benzoyl peroxide, etc. Hydrogen peroxide is preferred.

Any acid of strength sufficient to reduce the pH value of the emulsion to less than 3 may be used as the acid ingredient of the complex catalyst. Examples of acids suitable for such purpose are nitric acid, hydrochloric acid, and acetic acid, etc. In most instances nitric acid is preferred.

Any chromium salt which is soluble, or emulsifiable, in the reaction mixture and which contains chromium as the positive ion may be used as an agent for controlling the reaction to produce polymeric products of desired molecular weight. Examples of such salts are chromic chloride, chromic sulphate, chromic nitrate, chromic acetate, chromous acetate, chromous chloride, chromous sulphate, etc. The chromium salt need not be added as such, but may if desired be formed in situ, e. g. by adding to the mixture a chromium oxide and reacting the latter with the added acid to form a chromium salt.

Any emulsifying agent capable of forming a stable aqueous emulsion of the compound to be polymerized may be used. A wide variety of such emulsifying agents, e. g. egg albumen, alkali metal sulphonates of aliphatic hydrocarbons or alkyl-aromatic hydrocarbons of high molecular weight, etc., are well known. A sodium salt of sulphonated sperm oil is preferred, since changes in the proportion thereof do not influence to any great extent the molecular weight of the polymer which is formed.

The several essential ingredients of the reaction mixture may be admixed in any desired order. Usually the emulsion is formed by first preparing an aqueous solution of the peroxide, the acid, the chromium salt, and the emulsifying agent, adding the organic compound or compounds to be polymerized, and agitating the mixture to effect emulsification. When a product comprising polymer molecules of high molecular weight together with polymer molecules of relatively low molecular weight is desired, the chromium compound may be omitted at the start of the polymerization reaction, but be added during, and prior to completion of, the reaction.

The polymerization reaction is usually carried out by heating the emulsion at temperatures between 50° and 150° C. and preferably between 70° and 100° C. The reaction occurs rapidly and usually is complete in less than one hour. In some instances the reaction may be completed in less than 0.5 hour. After completing the reaction, the polymeric product is coagulated and precipitated in any of the usual ways, e. g. by freezing or by adding coagulating agents such as alcohol, sodium chloride, or calcium chloride, etc. The product is filtered, or otherwise separated from the liquor, washed free of adhering mother liquor, and dried.

The following example illustrates certain ways in which the invention has been practiced but is not to be construed as limiting its scope:

*Example*

In each of a series of experiments styrene was added to an aqueous solution of hydrogen peroxide, nitric acid, and a sodium salt of sulphonated sperm oil and the mixture was agitated to effect emulsification. The emulsion contained about 28 per cent by weight of styrene and it contained the hydrogen peroxide and the sodium salt of sulphonated sperm oil in amounts corresponding, respectively, to 0.24 and 2.0 per cent of the weight of the styrene. The nitric acid was present in amount such that the emulsion had a pH value of 2. Chromic nitrate was added to the several emulsions in varying amounts. In the following table, the proportion of the chromium salt employed in each experiment is expressed in terms of the parts by weight of chromium in the salt per million parts of styrene employed. Each emulsion was stirred and heated at 90° C. for 2½ hours after which the emulsion was treated with 3 parts by volume of ethyl alcohol, and the mixture was boiled to cause coagulation of the polystyrene product. The latter was separated by filtration, washed with alcohol, and dried. Its molecular weight was determined by the well-known Staudinger method. The table states the proportion of chromium nitrate employed in each experiment, in terms of the parts by weight of chromium per million parts of styrene, and it gives the molecular weight of the polystyrene which was formed.

| Run No. | P. P. M. of Cr | Molecular Weight |
| --- | --- | --- |
| 1 | 164.5 | 61,000 |
| 2 | 98.7 | 59,000 |
| 3 | 32.9 | 83,500 |
| 4 | 16.45 | 116,500 |
| 5 | 9.87 | 126,000 |
| 6 | 3.29 | 173,000 |
| 7 | 1.65 | 198,000 |
| 8 | 0.99 | 222,000 |
| 9 | 0.165 | 248,000 |
| 10 | 0.099 | 259,000 |

The graph shown in the drawing is based upon the above data. From the data and said graph, it will be seen that in order to polymerize styrene in such acidic, peroxide-containing emulsion to produce polystyrene having a molecular weight of less than 80,000, the emulsion should initially contain at least 37 parts by weight of chromium (as a dissolved or emulsified chromium salt) per million parts of styrene. It will also be seen that by initially adding a chromium salt in suitable amount, polystyrene having any of a wide range of molecular weights may be produced, i. e. the molecular weight of the polymer may be predetermined by controlling the amount of chromium salt added.

The method herein disclosed may advantageously be applied in polymerizing other vinyl aromatic compounds, or in copolymerizing such compounds with other readily polymerizable unsaturated organic compounds, to produce polymeric products of desired molecular weight.

For instance, it may be applied in polymerizing para-chloro-styrene, meta-ethyl-styrene, ortho-ethyl-styrene, para-ethyl-styrene, or para-isopropyl-styrene, or in copolymerizing styrene with butadiene or with methyl methacrylate, etc. In other words, the invention provides an improved general method for the rapid polymerization or copolymerization of vinyl aromatic compounds with control such as to permit the formation of polymeric products of predetermined molecular weight.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method wherein a monovinyl aromatic compound of the benzene series, having the vinyl radical attached to a carbon atom of the aromatic nucleus, is subjected to a polymerization reaction while dispersed in an aqueous emulsion which is of pH value between 1.5 and 3 and which contains in the emulsion a minor amount of a peroxide, the improvement which consists in dispersing in the emulsion, prior to completion of the polymerization reaction, a minor amount of a chromium compound containing chromium as a positive ion, said chromium compound being added in amount such as to contain between 0.099 and 164.5 parts by weight of chromium per million parts of the monovinyl aromatic compound.

2. In a method wherein a monovinyl aromatic compound of the benzene series, having the vinyl radical attached to a carbon atom of the benzene nucleus, is subjected to a polymerization reaction, the steps which consist in carrying out the polymerization in an acidic aqueous emulsion of the polymerizable material, which emulsion is of pH value between 1.5 and 2.8 and contains in dispersed form minor amounts of a peroxide and a chromium salt containing chromium as a positive ion, said chromium salt being added in amount such as to contain between 0.099 and 164.5 parts by weight of chromium per million parts of the monovinyl aromatic compound.

3. The method, as described in claim 2, wherein the polymerization reaction is carried out at temperatures between 50° and 150° C.

4. The method, as described in claim 2, wherein the peroxide is hydrogen peroxide, the polymerization reaction is carried out at temperatures between 70° and 100° C., and the dispersed chromium compound is present in amount such as to contain between 37 and 164.5 parts by weight of chromium per million parts of the organic compounds subjected to the polymerization reaction.

5. The method which comprises polymerizing a monovinyl aromatic compound of the benzene series, having the vinyl radical attached to a carbon atom of the aromatic nucleus, while dispersed in an acidic aqueous emulsion which is of pH value between 1.5 and 2.8 and which contains in dispersed form minor amounts of a peroxide and a chromium salt containing chromium as a positive ion, said chromium salt being added in amount such as to contain between 0.099 and 164.5 parts by weight of chromium per million parts of the monovinyl aromatic compound.

6. The method, as described in claim 5, wherein the polymerization is carried out at temperatures between 50° and 150° C.

7. The method as described in claim 5, wherein the peroxide is hydrogen peroxide, the emulsion is of pH value between 2 and 2.6 and contains the dispersed chromium salt in amount corresponding to between 37 and 164.5 parts by weight of chromium per million parts of the vinyl aromatic compound subjected to polymerization, and the polymerization reaction is carried out at temperatures between 70° and 100° C.

8. The method which comprises polymerizing styrene while dispersed in an acidic aqueous emulsion which is of pH value between 1.5 and 2.8 and which contains in dispersed form minor amounts of a peroxide and a chromium salt containing chromium as a positive ion, said chromium salt being added in amount such as to contain between 0.099 and 164.5 parts by weight of chromium per million parts of the monovinyl aromatic compound.

9. The method, as described in claim 8, wherein the peroxide is hydrogen peroxide and the polymerization is carried out at temperatures between 50° and 150° C.

10. The method, as described in claim 8, wherein the peroxide is hydrogen peroxide, the emulsion is of pH value between 2 and 2.6 and contains the dispersed chromium salt in amount corresponding to between 37 and 164.5 parts by weight of chromium per million parts of styrene subjected to the polymerization, and the polymerization reaction is carried out at temperatures between 70° and 100° C.

11. The method which comprises forming an acidic aqueous emulsion of styrene, which emulsion is of pH value between 2 and 2.6 and contains hydrogen peroxide in amount corresponding to more than 0.1 per cent of the weight of the styrene and chromic nitrate in amount such as to include between 37 and 164.5 parts by weight of chromium per million parts of styrene, and heating the emulsion to a polymerization temperature between 70° and 100° C.

EDGAR C. BRITTON.
WALTER J. LE FEVRE.

REFERENCES CITED

The following references are of record in the file of this patent:

UNITED STATES PATENTS

| Number | Name | Date |
|---|---|---|
| 1,910,846 | Maximoff | May 23, 1933 |
| 2,380,617 | Stewart | July 31, 1945 |